(12) United States Patent
Liedtke et al.

(10) Patent No.: US 8,253,093 B2
(45) Date of Patent: Aug. 28, 2012

(54) OPTOELECTRONIC DETECTOR ASSEMBLY AND METHOD OF OPERATING SAME

(75) Inventors: Mirko Liedtke, Jena (DE); Matthias John, Kleinpuerschuetz (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 11 days.

(21) Appl. No.: 12/849,967

(22) Filed: Aug. 4, 2010

(65) Prior Publication Data

US 2011/0032614 A1 Feb. 10, 2011

(30) Foreign Application Priority Data

Aug. 4, 2009 (DE) .......................... 10 2009 036 066

(51) Int. Cl.
*H01J 7/24* (2006.01)
*G01J 5/02* (2006.01)
*G01N 19/00* (2006.01)
*G01N 7/00* (2006.01)
*F24F 3/14* (2006.01)

(52) U.S. Cl. ................. 250/238; 250/339.03; 73/335.01; 73/31.05; 165/230

(58) Field of Classification Search ............. 250/363.04, 250/339.03, 458.1, 239, 370.15, 238; 356/244; 73/336.5, 335.01, 335.06, 31.01–31.05; 62/310, 62/311, 150, 175; 165/222–225, 230, 254
See application file for complete search history.

(56) References Cited

U.S. PATENT DOCUMENTS

| | | | | |
|---|---|---|---|---|
| 3,926,052 A | * | 12/1975 | Bechtel | ....................... 73/335.05 |
| 7,382,531 B2 | | 6/2008 | Tsuchiya et al. | |
| 7,633,053 B2 | * | 12/2009 | Wolleschensky et al. | .... 250/234 |
| 2005/0279949 A1 | * | 12/2005 | Oldham et al. | ............. 250/458.1 |
| 2005/0285046 A1 | * | 12/2005 | Iwanczyk et al. | ........ 250/370.15 |
| 2007/0193294 A1 | * | 8/2007 | Murray et al. | .................. 62/248 |

* cited by examiner

*Primary Examiner* — Georgia Y Epps
*Assistant Examiner* — Don Williams
(74) *Attorney, Agent, or Firm* — Jacobson Holman PLLC

(57) ABSTRACT

An optoelectronic detector and method of using same. In order to avoid any condensation on a surface, it has been known to heat such a surface. However, heating an optoelectronic detector will create a stronger hissing noise due to the greater dark current that is caused thereby. The invention is intended to avoid any condensation on an optoelectronic detector without airtight encapsulation. To this end, the detector is cooled and equipped with a sensor for the determination of a current value of one of the variables ambient humidity and ambient dew point temperature and a control unit that is connected with the sensor and designed to control the cooling device in dependence of such a value. By taking into account the ambient humidity or, respectively, the dew point temperature in the control of the cooling device, condensation on the detector can be avoided. An airtight encapsulation of the detector and the cooling device is not required.

21 Claims, 5 Drawing Sheets

OPTOELECTRONIC DETECTOR ASSEMBLY AND METHOD OF OPERATING SAME

CROSS-REFERENCE TO RELATED APPLICATIONS

The present patent application claims priority from German Application No. 10 2009 036 066.2, filed Aug. 4, 2009, which is incorporated herein by reference in its entirety.

BACKGROUND OF THE INVENTION (1) Field of the Invention

The invention relates to an optoelectronic detector assembly comprising a cooling device connected with a detector in a heat-conducting relationship, and a procedure for the operation of such a detector assembly.

(2) Description of Related Art Including Information Disclosed Under 37 CFR 1.97 and 1.98

Optoelectronic detectors, for example, semiconductor optoelectronic detectors as in the case of charge coupled devices (CCD) or secondary electron emission optoelectronic detectors as in the case of photo multipliers (PMT), have a temperature-dependent dark current that causes a hissing noise. The dark current can be reduced through cooling so that the measurable dynamic range will be increased. To prevent any undesired condensation of humidity on the detector through the cooling process (bedewing), at the current state of the art the detector including the cooling device is typically encapsulated in a Peltier element, an airtight housing, that is filled with a dried gas or emptied. The waste heat of the cooling device may be fed to a cooling element connected with the cooler in heat-conducting fashion and/or be used to heat other structural elements, for example an entry window of the housing. However, airtight encapsulation is expensive.

U.S. Pat. No. 7,382,531 B2 teaches arranging a high humidity space for a living specimen in front of a microscopic lens and heating the front lens of the object lens by means of a heating device to a temperature above the dew point temperature of the high humidity space in order to prevent a bedewing of the front lens. However, heating an optoelectronic detector is out of the question due to the higher dark current created thereby.

The invention is based on the objective of indicating an improved detector assembly of the type mentioned at the beginning that can be manufactured and be used at low cost.

BRIEF SUMMARY OF THE INVENTION

In terms of the invention, the detector may comprise an at least partially transparent housing within which any light that is to be detected is absorbed and transformed into an electric signal. In that case, the cooling device is typically connected with the housing in heat-conducting fashion but located outside of the housing. For example, in the case of a photo multiplier, the housing may contain a photocathode and a secondary electron multiplier. In particular, the housing may be evacuated. In the case of detectors on a semiconductor basis, the cooling device may be connected with the crystal in heat-conducting fashion. A heat-conducting connection may be created through direct mechanical contact or through heat-conducting elements such as, for example, heat pipes.

In accordance with the invention, the detector assembly comprises a sensor for the determination of a current value of one of the variables, ambient humidity and ambient dew point temperature, as well as a control unit connected with the sensor and designed to control the cooling device in dependence on such a value. Accordingly, a current value of one of the variables, ambient humidity and ambient dew point temperature, is determined in a process in accordance with the invention and the cooling device is controlled in dependence on such a value. In particular, these steps can be carried out repeatedly. The determined value can initially be preprocessed prior to its use for control of the cooling device. For example, control of the cooling device can be done by way of a variable derived from the measured current value, in particular under inclusion of additional measured variables. For example, the current ambient dew point temperature can be derived from the current ambient humidity and be used to control the cooling device.

In accordance with the invention, ambient humidity means the absolute or, preferably, the relative humidity of the air outside of the detector, in particular within a distance of 20 cm, 10 cm or 5 cm from the detector or, more precisely, from the housing of the detector. Accordingly, ambient dew point temperature means the dew point temperature of the air outside of the detector, in particular within a distance of 20 cm, 10 cm or 5 cm from the detector or, more precisely, from the housing of the detector. The optoelectronic detector may be, for example, a CCD, a PMT or an avalanche photo diode (APD). Other types of detector on a semiconductor basis may be involved as well, for example photonic mixer devices (PMD).

By taking into account the ambient humidity or, respectively, the dew point temperature with regard to control of the cooling device it will be possible to avoid any condensation on the detector. Thus, the invention makes it possible to dispense with an airtight encapsulation of the detector and the cooling device. It is only in this way that detector types that fundamentally cannot be encapsulated together with a cooling device will become usable for cooled operation in the first place.

In the case of the determination of the relative ambient humidity, an ambient air temperature should advantageously be determined as well and be taken into account in the control process. In the case of the determination of the relative ambient humidity, it will not be necessary to measure the ambient air temperature because the dew point temperature relevant for condensation is unambiguously related to the absolute humidity.

Preferably, an additional sensor for the determination of a current value of a temperature of the detector, more precisely of a surface of the detector, in particular of a housing of the detector, will be arranged on the detector. This will permit a monitoring of the detector temperature, in particular relative to the ambient dew point temperature.

It is further advantageous for the control unit to control the cooling device in such a way that the temperature of the detector or, respectively, of the detector surface will be above the ambient dew point temperature. This will prevent any condensation on the detector. Advantageously, the cooling device is equipped in this regard with a control circuit that controls the temperature of the detector according to a presettable command variable. This will put less stress on the control unit. To this end, a sensor for the determination of a current value of a temperature of the detector may provide for example the control variable of the control circuit.

In a preferred embodiment, the control unit determines a desired temperature of the detector with the aid of a preset desired temperature differential relative to the ambient dew point temperature and with the aid of the current ambient dew point temperature and issues it to the control circuit as a command variable. This will maintain the preset distance to the dew point even in the case of a variable ambient air temperature.

Alternatively to a sensor that permits a direct measurement of the ambient dew point temperature, a sensor for the determination of the current value of an ambient air temperature may be used in addition to the sensor for the determination of the current value of the relative ambient humidity. This may happen in particular in addition to the sensor for the determination of the current value of the temperature of the detector. The ambient dew point temperature can be determined indirectly based on the ambient air temperature and the relative ambient humidity, for example by means of a look-up table (LUT), and can be used to control the cooling device. Temperature sensors and relative humidity sensors are significantly more cost effective than special dew point gyrometers so that controlling the temperature of the detector relative to the ambient dew point temperature is possible at low cost. If a sensor for the determination of the current value of the absolute humidity is used, the dew point temperature can be derived there from without any additional parameters by means of a mathematical function or by means of a look-up table and can be used for control purposes.

In an additional embodiment of the invention, an ambient air of the detector is dried. This may be done by means of a humidity reducer for the drying of the ambient air of the detector (that is not in thermal contact with the detector). Drying may be done by cooling the ambient air below its dew point temperature. The humidity will condense below the dew point temperature with the effect that the absolute humidity of the cooled air will decrease. The dew point temperature is clearly linked with the absolute humidity so that by lowering the absolute humidity through drying/cooling, the dew point temperature will sink. Thus, by drying the ambient temperature, in particular through cooling below its dew point temperature, the dew point temperature of the ambient air will sink. The detector can thereby be cooled more intensely and the dark current can thus be further reduced than the ambience would permit otherwise. To this end, the humidity reducer may comprise its own cooling device in addition to the cooling device for the detector.

Preferably, the additional cooling device of the humidity reducer is set (by the control unit) to a lower temperature than the cooling device which is connected to the detector in heat-conducting fashion. As a result, any condensation will take place on the humidity reducer not on the detector itself.

In an embodiment having a humidity reducer, the detector assembly preferably comprises a fan to blow the dried air onto the detector. This may serve to more quickly reduce the ambient dew point temperature at the detector. Advantageously, the sensor for the determination of one of the variables, ambient humidity and ambient dew point temperature, should be arranged in the airflow.

The invention also comprises a microscope, in particular a laser-scanning microscope, with an optoelectronic detector assembly in accordance with the embodiments described above and in the following.

BRIEF DESCRIPTION OF THE SEVERAL VIEWS OF THE DRAWINGS

The invention will be explained in the following drawings with the aid of several embodiments. Corresponding parts are identified in all drawings by the same reference numbers.

DETAILED DESCRIPTION OF THE INVENTION

Figure 1:
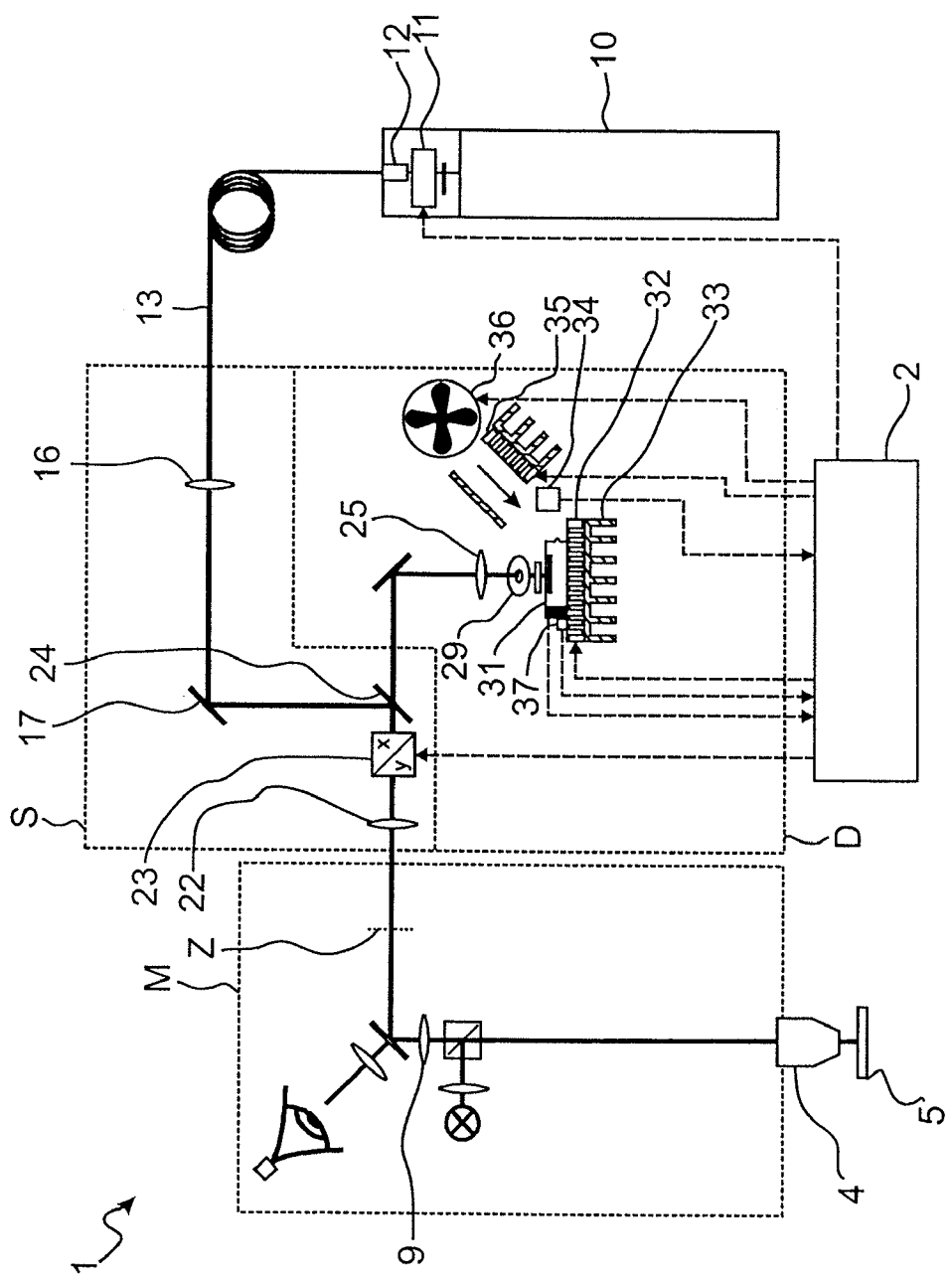
FIG. 1 is a schematic diagram of a microscope with a cooled optoelectronic detector.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a microscope 1 in the form of a laser-scanning microscope in a schematic representation. It consists of a microscope unit M and a scanning unit S that have a common interface via an interim image Z as well as a detection unit D. The scanning unit S can be connected with the phototube of an upright microscope as well as with the lateral outlet of an inverted microscope. The microscope unit M has an object lens 4 and a tube lens 9 for viewing a specimen 5. A laser 10 whose laser beam, after exiting, initially propagates freely and passes through an acousto-optical structural element 11, for example an AOTF, is provided as a measuring light source. The laser beam is then coupled with the illumination beam path of the scanning unit S by means of a coupled optics 12 and an optic fiber 13. The laser beam can be suppressed by the control unit 2 by means of the acousto-optical structural element 11.

The scanning unit S contains collimating optics 16, a deflection mirror 17, a scanning lens 22, a scanner 23, a main beam splitter 24 and projection optics 25 for the detection process. A pinhole aperture 29, an emission filter and a detector 31 in the form of a photo multiplier are arranged downstream of the projection optics 25. For heat conduction, the detector 31 is in contact with the cold side of a Peltier element serving as cooling device 32. The warm side of the Peltier element 32 is connected in thermally conducting fashion with a cooling element 33, such as a heat sink, that releases the waste heat of the cooling device to the ambiance of the microscope 1. The detector 31 and the cooling device 32 are not enveloped by a common water vapor-tight casing (as in the state of the art) but are in contact with the ambiance of the detection unit D. A dew point hygrometer is arranged as a sensor 34 for the determination of the ambient dew point temperature in the area of the detector 31 at a distance from the latter.

A humidity reducer 35 in the form of a second Peltier element is arranged upstream of a fan 36 in such a way that dried air can be blown over the detector 31 and the sensor 34. In the sense of the invention, only this flow of air is regarded as ambient air since it determines the condensation behavior on the detector surface. Due to the drying process, this ambient air has a lower absolute humidity than the remaining ambiance. A sensor 37 for the determination of the surface temperature of the detector 31 is arranged away from the airflow.

Any other type of cooling/drying process may be used as humidity reducer 35 in lieu of a Peltier element. For example, a common air conditioner (AC) may be utilized.

Figure 1A:
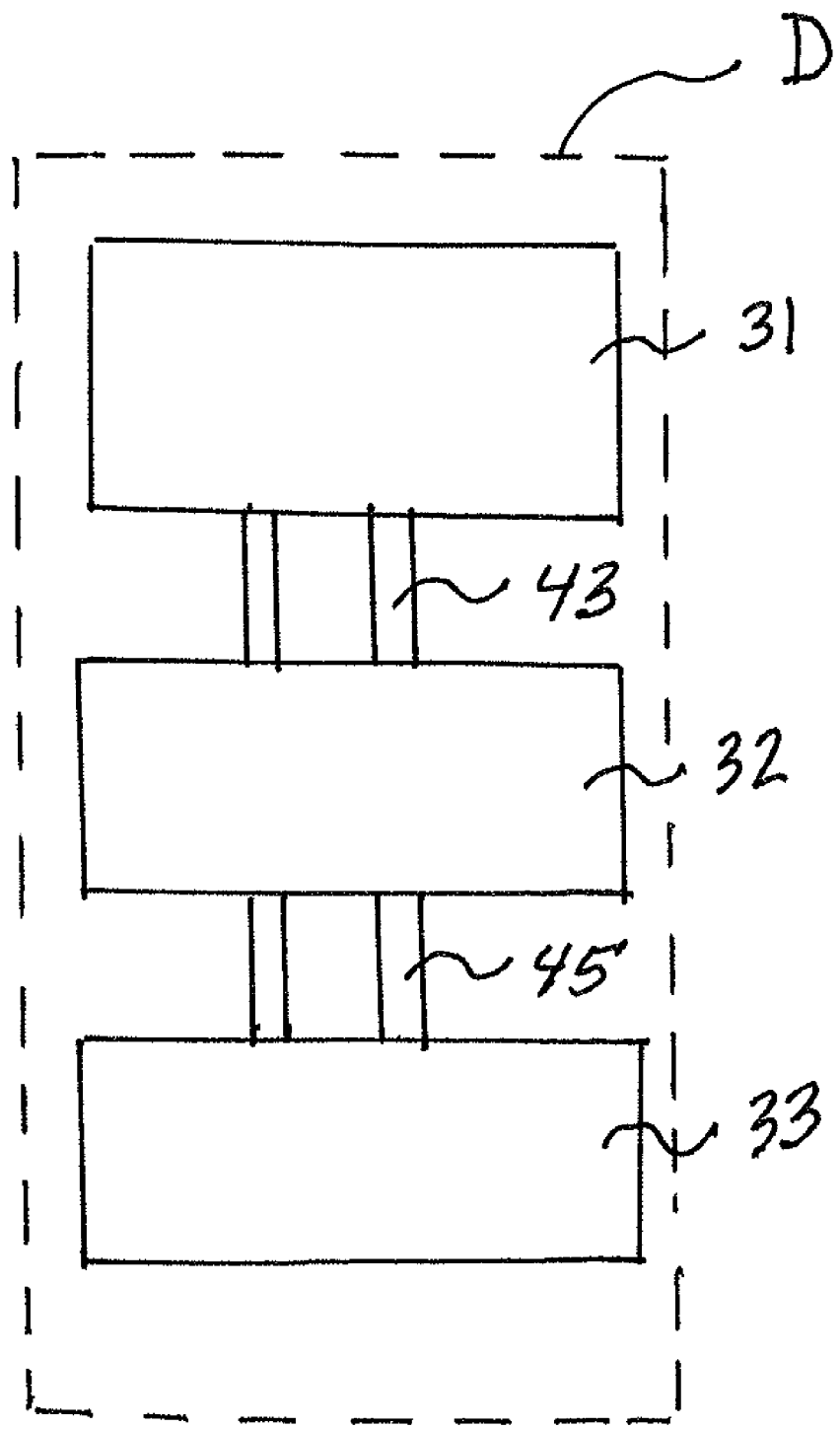
FIGS. 1A and 1B are schematic diagrams of alternative embodiments employing heat pipes.
Figure 1B:
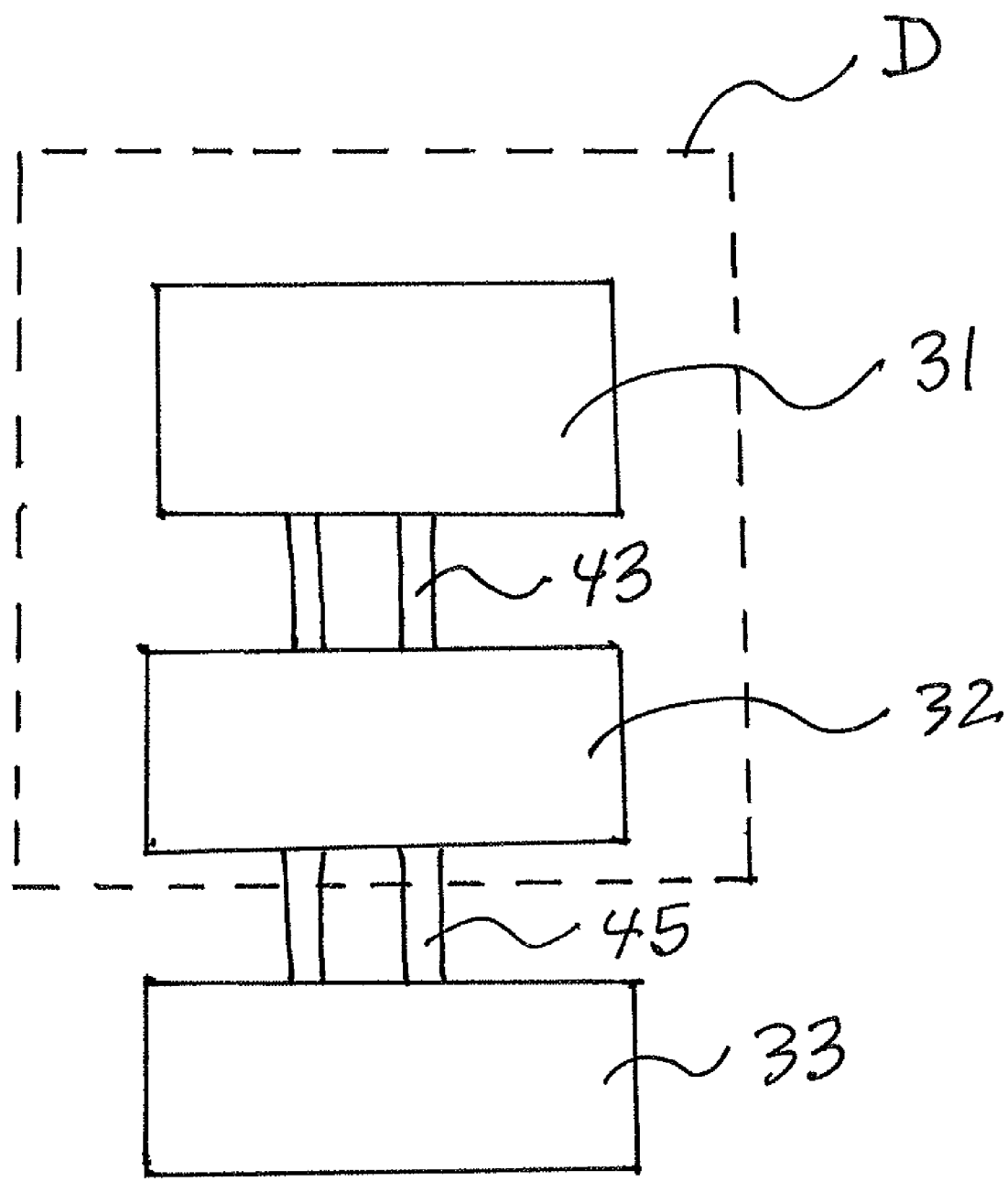

In alternative embodiments, the detector 31 may be connected with the cooling device 32 via heat pipes 43 in heat conducting fashion. Accordingly, heat pipes 45 may be arranged between the cooling device 32 and the cooling element 33 (FIG. 1A). In more advanced embodiments, the cooling element 33 may be arranged outside of the detection unit D (FIG. 1B).

A humidity reducer 35 and a fan 36 may be dispensed with in all embodiments; alternatively, the humidity reducer 35 and/or the fan 36 can simply be turned off. In that case, the ambient dew point temperature may be regarded as constant within the detection unit so that the precise location of the sensor 34 will not be relevant.

Figure 2:
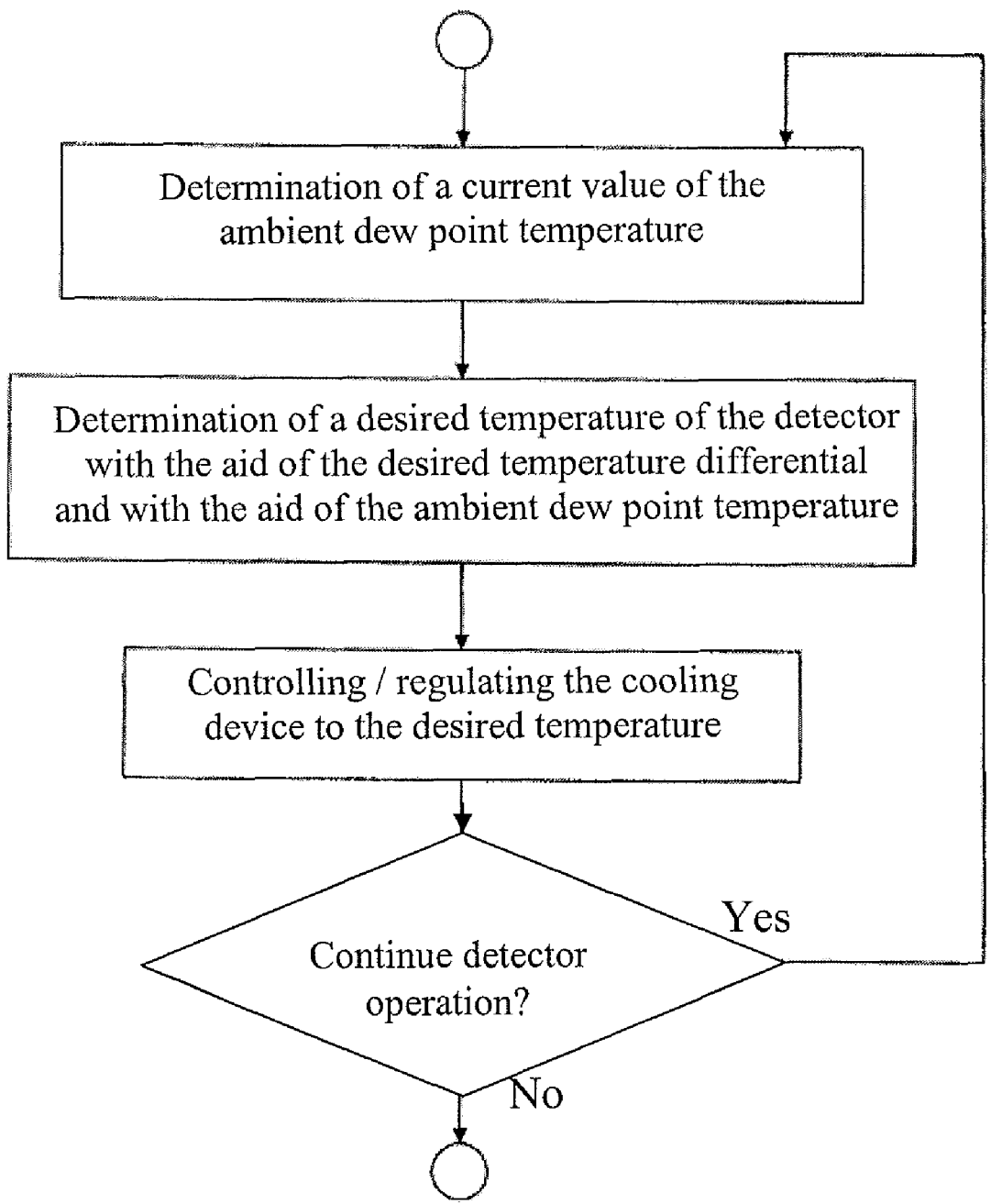
FIG. 2 is a flow diagram of an operating procedure for the detector.

The operating procedure for the detector assembly 41 is shown in FIG. 2 in a flow diagram. It is carried out by the control unit 2. During detector operation, the control unit 2 determines the ambient dew point temperature initially by means of the sensor 34. It then determines a desired temperature for the detector 31 with the aid of a preset desired temperature differential relative to the ambient dew point temperature and compares it with the actual surface temperature of the detector 31 which it determines by means of the sensor 37. Depending on the result of the comparison, it will turn on the cooling device 32 if the desired temperature is lower than the actual temperature.

To this end, it may, for example, increase the cooling output in the event of a major differential between the actual and the desired values but not in the case of a minor differential. This may be done, for example, by adjusting the intensity of the current by means of the Peltier element 32 or through pulse width modulation (PWM). When the actual temperature reaches the desired temperature, the control unit 2 will turn off the cooling device 32. This function of the control unit 2 represents a control circuit for the cooling device into which the desired temperature is incorporated as a command variable. Alternatively, the control circuit for the cooling device 32 may be arranged outside of control unit 2 and be connected with the sensor 37 so that the control unit will release only the desired temperature to the control circuit and the latter will take over the remaining control function.

If, for example, an ambient dew point temperature of +2.1° C. is measured in the flow of dried ambient air and if a desired temperature differential of +1.5 K is preset, the control unit will adjust the cooling device 32 with the aid of the sensor 37 to a temperature of +3.6° C. and maintain it until the ambient dew point temperature changes. The flow of dried air has, for example, a relative humidity of 25%, while in the remaining ambiance a relative humidity of 55% prevails. Without drying, the dew point temperature would be approximately +11° C. so that the detector would be cooled down to only 12.5° C. which would result in a stronger dark current.

The Peltier element may be equipped with its own control circuit to control the temperature. Preferably, the humidity reducer is operated at a temperature that is clearly below the dew point temperature of the undried air. In particular, it may be set to a constant temperature differential relative to the detector temperature (sensor 37), for example at 20° C. below the latter.

Figure 3:
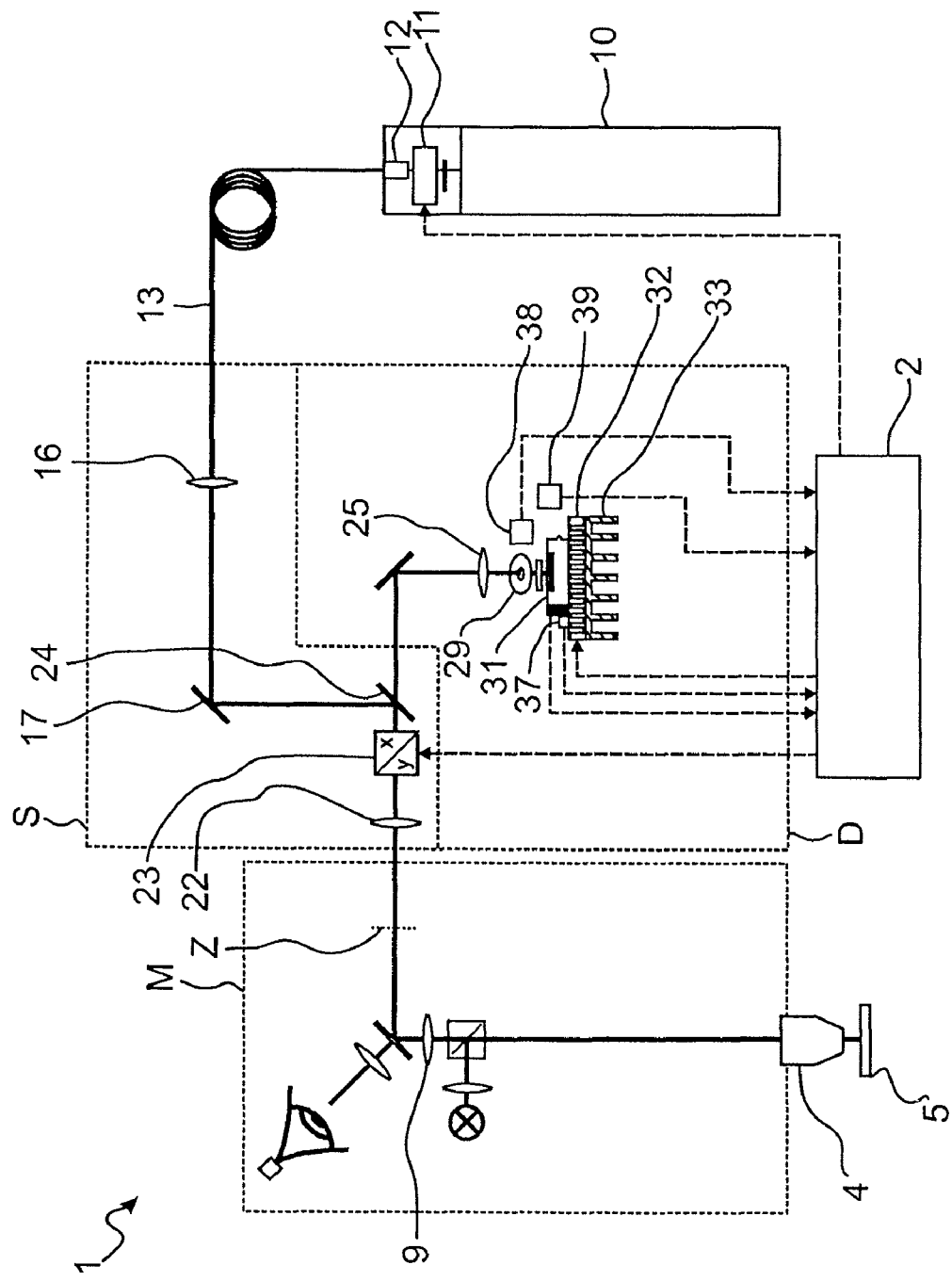
FIG. 3 is a schematic diagram of a second microscope with an alternative detector arrangement.

FIG. 3 shows an alternative embodiment in which the ambient dew point temperature is not measured directly by means of a dew point hygrometer but indirectly by means of a sensor 38 for the determination of the ambient air temperature and a sensor 39 for the determination of the relative ambient humidity. In this case, no humidity reducer and no fan are present so that in this case, the entire amount of air of the detection unit D represents the ambient air.

The control unit 2 locates in a look-up table the current ambient dew point temperature with the aid of the measured values for the current ambient air temperature and the current relative ambient air temperature. If, for example, an ambient air temperature of 20° C. and a relative humidity of 60% are measured, a dew point temperature of 12.0° C. will be found in the look-up table. If a desired temperature differential of, for example, 1.0 K is preset, the control unit 2 will adjust the cooling device with the aid of the sensor 37 to a temperature of 13.0° C. and maintain it until one of the input variables (relative humidity and temperature of the ambient air) changes.

Instead of determining relative humidity, the sensor 39 may be designed for the determination of absolute humidity. In that case, a sensor 38 for the measurement of the ambient air temperature will not be required because the dew point temperature clearly depends on the absolute humidity. In that case, the control unit 2 will determine the current ambient dew point temperature with the aid of the current absolute humidity and adjust the cooling device 32 for the detector in such a way that it will not be reached.

In embodiments without an additional humidity reducer 35, the sensor 39 for the determination of the (absolute or relative) humidity may be located outside of the detection unit D since the absolute humidity within an architectonic space varies locally only to a minor degree, if at all.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMBERS & SYMBOLS 1 microscope
2 control unit
4 lens
5 specimen
9 tube lens
10 laser
11 acousto-optical structural element
12 coupled optics
13 optical fiber
16 collimating optics
17 deflection mirror
22 scanning lens
23 scanner
24 main beam splitter
25 projection optics
29 pinhole aperture
31 detector
32 cooler
33 cooling element
34 sensor for the determination of the surface temperature of the detector
35 humidity reducer
36 fan
37 temperature sensor for the determination of the ambient air temperature
38 humidity sensor for the determination of the ambient humidity
41 optoelectronic detector assembly
43 heat pipes
45 heat pipes
M microscope unit
S scanning unit
Z interim image
D detection unit

What is claimed is:
1. An optoelectronic detector assembly comprising:
a photo detector;

a cooling device;
a heat-conducting connection between the cooling device and the detector;
a sensor for determining a real-time value of one of ambient humidity and ambient dew point temperature; and
a control unit connected with the sensor for controlling the cooling device in dependence on the determined real-time value so that the temperature of the detector is maintained above the ambient dew point temperature.

2. The optoelectronic detector assembly in accordance with claim 1, further comprising a temperature sensor for the determination of a real-time value of a temperature of the detector, the temperature sensor being arranged on the detector.

3. The optoelectronic detector assembly in accordance with claim 2, wherein the cooling device further comprises a control circuit that controls the temperature of the detector according to a presettable command variable.

4. The optoelectronic detector assembly in accordance with claim 3, wherein the control unit determines a desired temperature of the detector with the aid of a preset desired temperature differential relative to the ambient dew point temperature and transmits the desired temperature of the detector to the control circuit as a command variable.

5. The optoelectronic detector assembly in accordance with claim 2, further comprising a temperature sensor for determining the real-time value of an ambient air temperature.

6. The optoelectronic detector assembly in accordance with claim 1, further comprising a humidity reducer to dry ambient air around the detector.

7. The optoelectronic detector assembly in accordance with claim 6, further comprising a fan to blow the dried ambient air onto the detector.

8. The optoelectronic detector assembly in accordance with one claim 1, with the detector and the cooling device not being encapsulated by a common water vapor-tight casing.

9. A microscope with an optoelectronic detector assembly in accordance with claim 1.

10. A microscope according to claim 9, wherein the microscope is a laser-scanning microscope.

11. The optoelectronic detector assembly in accordance with claim 1, wherein the heat-conducting connection is a direct connection between the cooling device and the detector.

12. The optoelectronic detector assembly in accordance with claim 1, wherein the heat-conducting connection is created through direct mechanical contact between the cooling device and the detector.

13. The optoelectronic detector assembly in accordance with claim 1, wherein the heat-conducting connection is created through heat-conducting elements connecting the cooling device to the detector.

14. The optoelectronic detector assembly in accordance with claim 13, wherein the heat-conducting elements are heat pipes arranged between the cooling device and the detector.

15. The optoelectronic detector assembly in accordance with claim 1, wherein the sensor is connected to the cooling device via the control unit.

16. A method for operating an optoelectronic detector, wherein the detector is cooled by a cooling device connected to the detector by a heat-conducting connection, the method comprising the steps of:
determining a real-time value of one of the variables consisting of ambient humidity and ambient dew point temperature, using a sensor, and
controlling the cooling device with a control unit connected with the sensor in dependence on the determined real-time value so that the temperature of the detector is maintained above the ambient dew point temperature.

17. The method in accordance with claim 16, with the determining and controlling steps being carried out repeatedly.

18. The method in accordance with claim 16, further comprising the steps of:
measuring the ambient air temperature;
measuring the relative ambient humidity; and
determining ambient dew point temperature with the aid of the ambient air temperature and the relative ambient humidity.

19. The method in accordance with claim 18, further comprising the step of drying ambient air around the detector being dried, in particular by means of cooling.

20. The method in accordance with claim 19, wherein the drying is accomplished by means of cooling.

21. The method in accordance with claim 16, further comprising the step of determining a real-time value of the temperature of the detector, using a temperature sensor.

* * * * *